United States Patent
Sullivan et al.

(10) Patent No.: US 7,228,549 B2
(45) Date of Patent: Jun. 5, 2007

(54) METHOD AND SYSTEM FOR ENHANCED CONCURRENCY IN A COMPUTING ENVIRONMENT

(75) Inventors: Herbert W. Sullivan, deceased, late of New York, NY (US); by Joan Todd, legal representative, New York, NY (US); Clifford L. Hersh, Berkeley, CA (US)

(73) Assignee: ANTs Software, Inc., Burlingame, CA (US)

( * ) Notice: Subject to any disclaimer, the term of this patent is extended or adjusted under 35 U.S.C. 154(b) by 580 days.

(21) Appl. No.: 09/729,515

(22) Filed: Dec. 4, 2000

(65) Prior Publication Data

US 2002/0029239 A1    Mar. 7, 2002

Related U.S. Application Data

(60) Provisional application No. 60/168,861, filed on Dec. 2, 1999.

(51) Int. Cl.
*G06F 9/46*   (2006.01)
*G06F 15/167* (2006.01)
*G06F 12/00*  (2006.01)
*G06F 7/00*   (2006.01)

(52) U.S. Cl. .................... 719/312; 709/214; 709/215; 709/216; 711/147; 711/148; 711/149

(58) Field of Classification Search ................ 709/312, 709/313, 100–108, 214–216; 711/101–173; 712/200–248; 710/1–74; 718/104, 102, 718/106; 719/312–313; 707/8, 9
See application file for complete search history.

(56) References Cited

U.S. PATENT DOCUMENTS

| 4,901,230 | A  | * | 2/1990 | Chen et al. ................. 711/149 |
| 5,579,505 | A  | * | 11/1996 | Ohkami ...................... 711/155 |
| 6,360,220 | B1 | * | 3/2002 | Forin .............................. 707/8 |
| 6,629,152 | B2 | * | 9/2003 | Kingsbury et al. ......... 709/313 |
| 7,039,865 | B1 | * | 5/2006 | Hersh ......................... 715/530 |

* cited by examiner

*Primary Examiner*—Meng-Al T. An
*Assistant Examiner*—Charles Anya
(74) *Attorney, Agent, or Firm*—Carr & Ferrell LLP

(57) ABSTRACT

A system and method for performing an operation within limits upon a shared value stored in an actual value location. The method provides a plurality of memory locations, two of the memory locations being first and second reservation memory locations, and two of the memory locations being limit memory locations containing limit values. An operand is obtained and the operation is performed upon an affected reservation register using the operand. A resulting value is compared to the limit values in the limit memory locations and if the resulting value is not within the values in the limit memory locations, an inverse operation is performed to restore the affected reservation register and a failure is reported. Else the operation is performed to update the actual value location, the operation is performed to update an unaffected reservation register, and a success is reported.

17 Claims, 3 Drawing Sheets

METHOD AND SYSTEM FOR ENHANCED CONCURRENCY IN A COMPUTING ENVIRONMENT

CROSS REFERENCE TO RELATED APPLICATIONS

The present application claims priority from U.S. Provisional Patent Application Ser. No. 60/168,861, filed on Dec. 2, 1999 by Herbert W. Sullivan and Clifford L. Hersh, the complete specification of which is hereby incorporated by reference.

BACKGROUND OF INVENTION

Uninterruptible or atomic operations are operations that cannot be interrupted by another processor or by another thread on the same processor. Intel processors, for example, perform addition as an atomic machine instruction with extremely short locking implemented by a cache coherency mechanism. A LOCK prefix implements the atomic operation for a set of operations that do read-modify-write operations on a single memory address such as the LOCK XADD instruction (Exchange Add). The lock time of atomic instructions is generally very short.

Current technology suffers from the inability to add or subtract from a shared memory location without locking the location during the operation if it is necessary to keep the value within limits or maintain a valid transaction log. Using atomic operations, it is possible to add or subtract without locking which causes blocking, provided that there are no limits and a valid transaction log is not necessary.

Therefore, a need exists for a system and method for enhancing concurrent computation with shared resources. Further, a need exists for a software-based system that is capable of enhancing the concurrency of any multiprocessor computing system.

SUMMARY OF THE INVENTION

The invention provides a system and method for adding and subtracting within limits without blocking. A thread comprises an operation including either addition of an addend or subtraction, which is performed as addition of a negative of the addend. The operation affects a shared actual value stored in an actual value register. Upper and lower limit registers store permissible upper and lower limits within which the result of the operation must fall. Addition and subtraction reservation registers, which are also shared resources, store a reserved value after an addition to the actual value or after a subtraction from the actual value respectively.

The method includes getting the value of the addend. If the operation is addition the value of the addend is positive, otherwise it is negative. A LOCK XADD operation using the addend is performed on an affected reservation register, i.e., the addition reservation register if the operation is addition or the subtraction reservation register if the operation is subtraction. The resulting value in the affected reservation register is then compared to the value of the limit registers. If the operation cannot succeed, the addend is added back to the affected reservation register in a LOCK XADD operation and a failure is reported.

If the operation can succeed, in a LOCK XADD operation the addend is added to the value of the actual value register. Finally, in a LOCK XADD operation, the addend is added to the value of the unaffected reservation register which was not affected by the first atomic operation and a success is reported Aspects of the invention include a computer-implemented method for adding and subtracting within limits without blocking. Another aspect of the invention provides a system having a central processing unit (CPU) and a memory which are configured to effect the method described above. Another aspect includes a computer program recorded on a computer readable medium for causing a computer to effect the method as described above.

The foregoing and other objects and advantages of the disclosed system and method will become apparent to those of ordinary skill in the art after having read the following detailed description of the preferred embodiments that are illustrated in the various drawing figures.

DETAILED DESCRIPTION

Current technology suffers from the inability to add or subtract from a shared memory location without locking the location during the operation if it is necessary to keep the value within limits or maintain a valid transaction log. Using the uninterruptible operations common to most general purpose CPUs, it is possible to add or subtract without blocking, provided that there are no limits and a valid transaction log is not necessary.

It has been found that an unlimited number of threads to add and subtract from a single shared memory location without blocking, overflow, or underflow. Further, the transaction log can always be valid so that error recovery is possible.

A thread of execution may be defined as a sequence of instructions which are parsed out of memory and executed by the processing hardware and whose state is maintained on a single stack. A shared value can be characterized as an area of memory that is accessible from at least two threads of execution. An uninterruptible instruction may be an instruction that reads an area of memory and does not permit another thread of execution to read or write that same area of memory until the instruction has completed. A limit can be defined as a value that the contents of a memory location must not pass (such as zero for inventory items or the end of allocated memory space for a pointer).

A single memory location can be included that may be accessed only by an interruptible add or subtract operation such as LOCK XADD (exchange and add) on the Pentium or a nondestructive operation such as a read. Such a device may safely permit many threads to add or subtract, but it is impossible to determine whether incomplete transactions have occurred or to execute instructions, such as extended precision, that require synchronization.

One more memory location (for a total of two) may be added that can be accessed by uninterruptible instructions only, whatever limits exist (limits may exist in one direction only) and a transaction log. Now an addition or subtraction is accomplished by adding (a negative number for subtraction) to one of the locations (each thread must use the two locations in the same order), if the operation does not place the total on the wrong side of the limits, then the operation is recorded in the transaction log and then added to the second memory location. If the total violates the limit (is smaller than the lower limit or larger than the upper limit) the number is subtracted from the first number. The failure may be recorded in a transaction log. Generally, this is an implementation detail. This device can guarantee a correct result, and that the total includes only valid operations, but it leaves a significant chance that a valid transaction will not occur.

Figure 1:
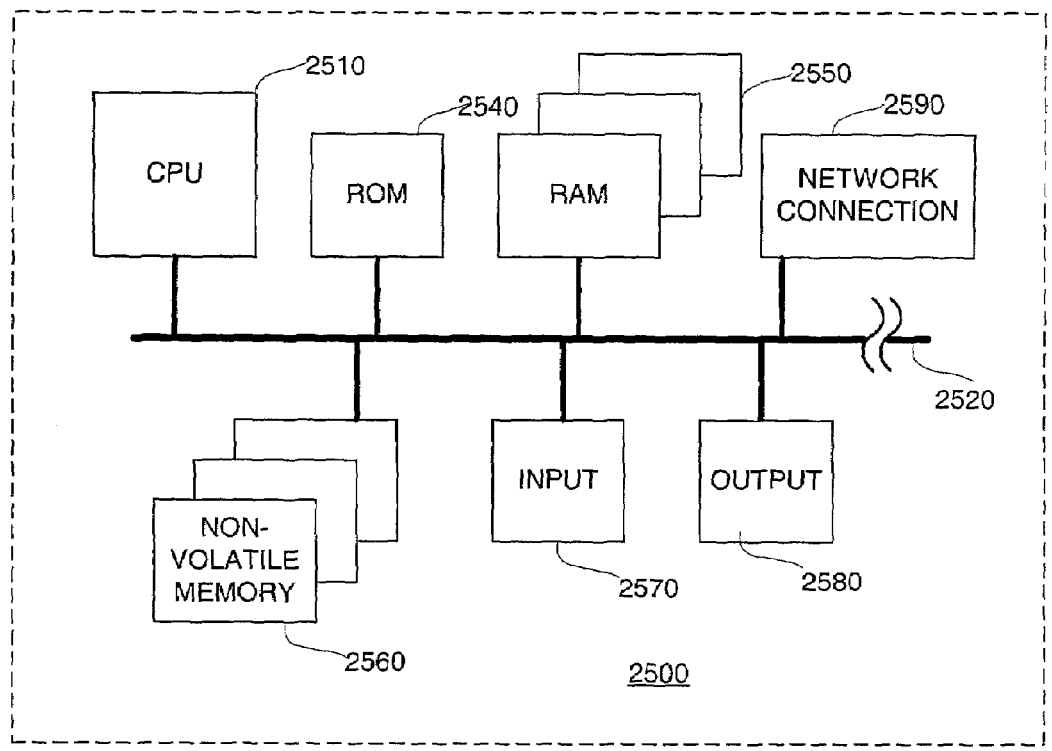
FIG. 1 illustrates a portion of a conventional computer system, including a CPU and a memory, in which the present invention may be embodied.

A preferred embodiment of the invention is practiced in the context of a conventional personal computer such as an IBM compatible personal computer, an Apple Macintosh computer or a UNIX-based workstation. FIG. 1 shows a representative hardware configuration of a computer 2500 including a central processing unit (CPU) 2510, such as a microprocessor, and a number of other units interconnected via a system bus 2520. The computer 2500 may also include Read Only Memory (ROM) 2540, Random Access Memory (RAM) 2550, Non-Volatile Memory 2560, input devices 2570 (such as a keyboard, mouse, microphone, and touch screen) and output devices 2580 (such as a display screen, printer, and speaker) coupled to the system bus 2520. A Network Connection 2590 may be provided for connecting computer 2500 to a communication network (not shown) such as an intranet or the Internet. The computer 2500 typically operates under control of an operating system such as the Microsoft Windows NT or Windows/98 OS, IBM OS/2, MAC OS, or UNIX operating system. Those skilled in the art will appreciate that the disclosed system and method can also be implemented on platforms and operating systems other than those mentioned.

Figure 2:
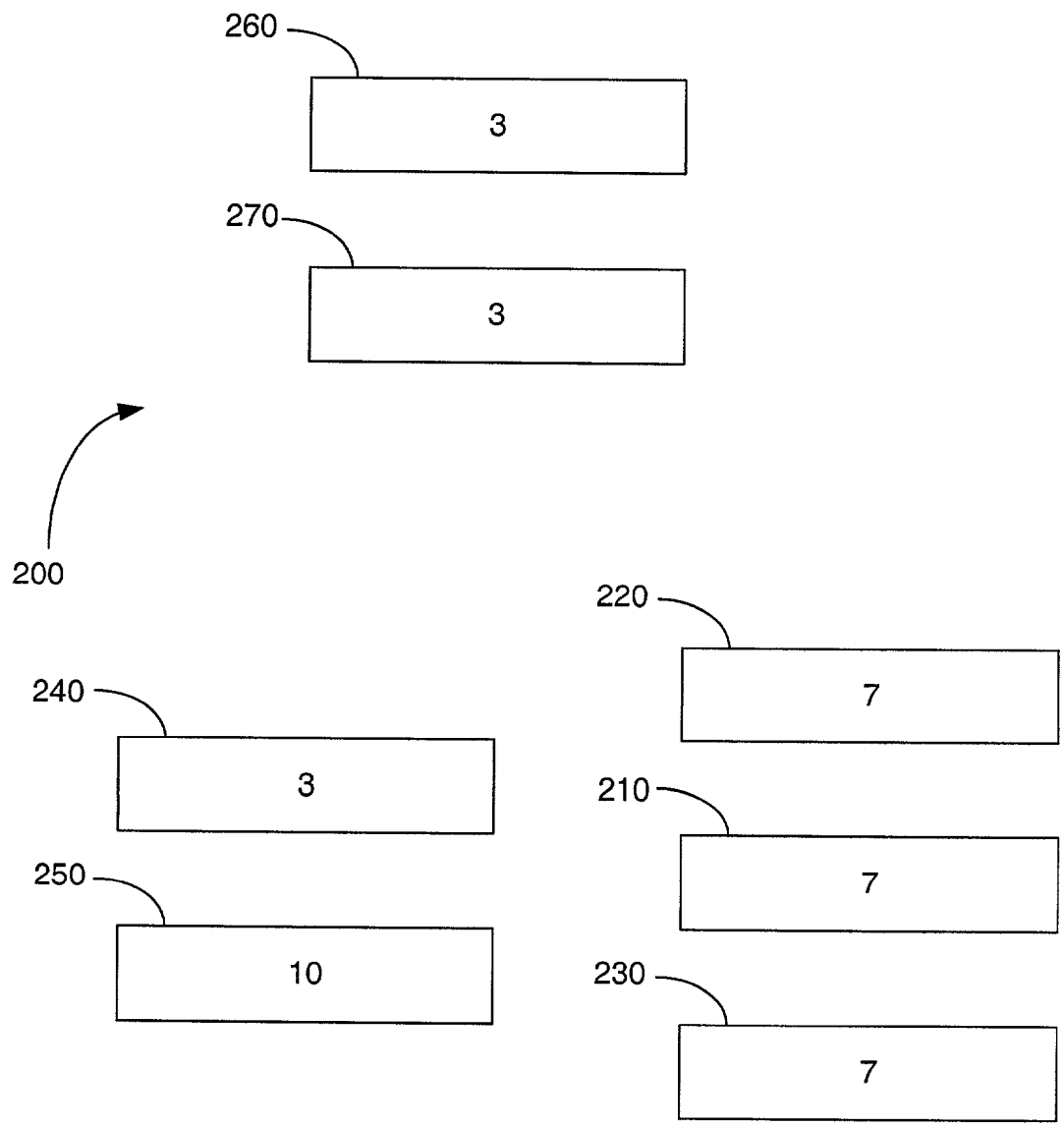
FIG. 2 illustrates a system block diagram in accordance with a preferred embodiment of the invention.

With reference to FIG. 2, a system for adding within limits without blocking is shown generally designated 200. The system includes an actual value register 210, a subtraction reservation register 220, an addition reservation register 230, a lower limit register 240, and an upper limit register 250. RAM 2550 may include the registers 210, 220, 230, 240, and 250.

A thread of execution including an atomic addition or subtraction operation (subtraction as addition of a negative value of an addend) is operable to operate upon the value stored in actual value register 210. By way of example, actual value register 210 is shown to have a value of 7 which may include the value of current inventory.

Subtraction and addition reservation registers 220 and 230 store a reserved value including the value of the actual value register 210 after the operation. Thus for addition, the value of addition reservation register 230 is the actual value increased by the value of the addend and for subtraction the value of subtraction reservation register 220 is the value of the actual value decreased by the value of the addend.

Limit registers 240 and 250 store the value of the limits within which the operation is constrained. In the exemplary case of inventory control, the lower limit register 240 is shown to have a value of 3 and the upper limit register 250 is shown to have a value of 10.

Figure 3:
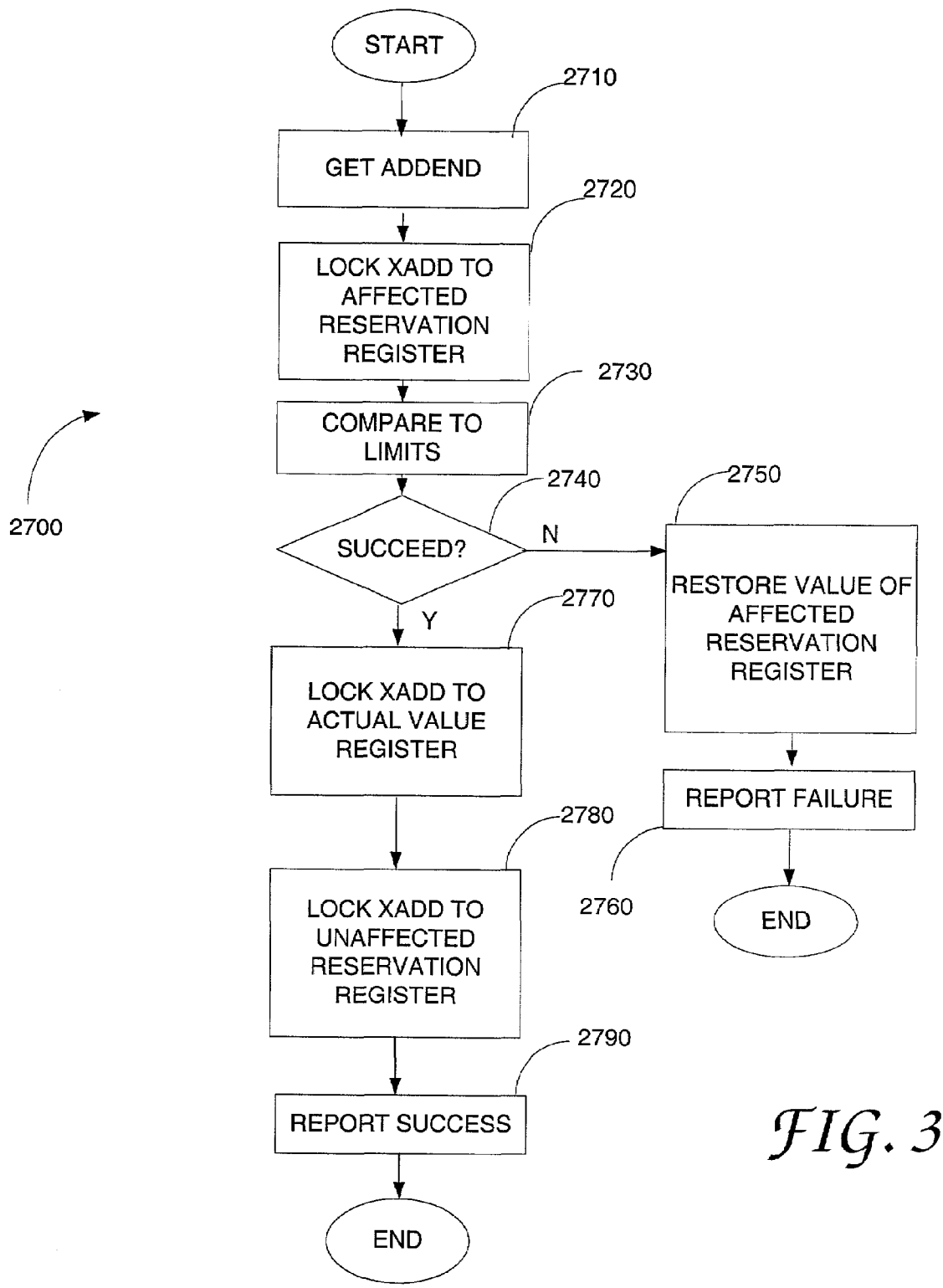
FIG. 3 illustrates the overall process for implementing a method for adding and subtracting within limits without locking.

With reference to FIG. 3, the method of the invention generally designated 2700 comprises a step 2710 in which the value of the addend, –3 in the exemplary case indicating a request of 3 items of inventory, is obtained. If the operation is addition, the value of the addend is positive, otherwise it is negative.

In a step 2720 a LOCK XADD operation is performed upon the value stored in an affected reservation register using the addend. If the operation is addition, the affected reservation register is the addition reservation register 230, otherwise it is the subtraction reservation register 220. Thus in the exemplary case, the addend –3 is added to the subtraction reservation register 220, resulting in a value of 4 in the subtraction reservation register 220.

In a step 2730, the value of the affected reservation register is compared to the value of the limit registers 2540 and 2550. In a step 2740, it is determined if the operation can succeed within the limits. In the exemplary case, the value of the subtraction reservation register 220 is 4, which is greater than or equal to the lower limit of 3 stored in lower limit register 2540 and less than or equal to the upper limit of 10 stored in the upper limit register 250. Therefore the operation can succeed within the limits.

If the operation cannot succeed, in a step 2750, the value of the affected reservation register is restored by performing a LOCK XADD using the negative of the value. Thus in the example, 3 is added back to the value of 4 stored in the subtraction reservation register 220 to restore the initial value of 7 stored in the subtraction reservation register 220. Finally, a failure is reported in a step 2760 and the process ends.

If the operation can succeed, in a LOCK XADD operation 2770, the addend is added to the value stored in the actual value register 210 and written to the actual value register 210. In a step 2780, in a LOCK XADD operation, the addend is added to the reservation register unaffected by the first LOCK XADD operation of step 2720. In the exemplary case, the unaffected reservation register is the addition reservation register 230 and thus –3 is added to 7 and loaded into the addition reservation register 260. Finally, in a step 2790, a success is reported and the process ends.

What is claimed is:

1. A processing system for performing addition and subtraction within limits upon a shared value comprising:

means for performing a first uninterruptible operation upon the shared value stored in an affected reservation location, the first uninterruptible operation using an operand;

means for comparing a resulting value of the first uninterruptible operation stored in the affected reservation location to an upper value and a lower value to determine if the resulting value is within a range defined by the upper value and the lower value that can be changed;

means for performing a second uninterruptible operation to restore the affected reservation location if the resulting value of the first uninterruptible operation is not within the range defined by the upper value and the lower value;

means for reporting a failure if the resulting value of the first uninterruptible operation is not within the range defined by the upper value and the lower value;

means for performing a third uninterruptible operation to update an actual value location if the resulting value of the first uninterruptible operation is within the range defined by the upper value and the lower value;

means for performing a fourth uninterruptible operation to update an unaffected reservation location if the resulting value of the first uninterruptible operation is within the range defined by the upper value and the lower value; and means for reporting a success if the resulting value of the first uninterruptible operation is within the range defined by the upper value and the lower value.

2. The processing system of claim 1 wherein the first, second, third, and fourth uninterruptible operations are LOCK XADD operations.

3. A processing system for performing addition and subtraction within limits upon a shared value comprising:
   means for receiving an operand;
   means for performing a first uninterruptible operation upon the shared value stored in an affected reservation location, the first uninterruptible operation using the operand;
   means for comparing a resulting value of the first uninterruptible operation stored in the affected reservation location to an upper value and a lower value to determine if the resulting value is within a range defined by the upper value and the lower value that can be changed;
   means for performing a second uninterruptible operation to restore the affected reservation location if the resulting value of the first uninterruptible operation is not within the range defined by the upper value and the lower value;
   means for reporting a failure if the resulting value of the first uninterruptible operation is not within the range defined by the upper value and the lower value;
   means for performing a third uninterruptible operation to update an actual value location if the resulting value of the first uninterruptible operation is within the range defined by the upper value and the lower value;
   means for performing a fourth uninterruptible operation to update an unaffected reservation location if the resulting value of the first uninterruptible operation is within the range defined by the upper value and the lower value; and
   means for reporting a success if the resulting value of the first uninterruptible operation is within the range defined by the upper value and the lower value.

4. The processing system of claim 3 wherein the first, second, third, and fourth uninterruptible operations are LOCK XADD operations.

5. A method for performing addition and subtraction within limits upon a shared value comprising the steps of:
   performing a first uninterruptible operation upon the shared value stored in an affected reservation location, the first uninterruptible operation using an operand;
   comparing a resulting value of the first uninterruptible operation stored in the affected reservation location to an upper value and a lower value to determine if the resulting value is within a range defined by the upper value and the lower value that can be changed;
   if the resulting value is not within the range defined by the upper value and the lower value:
      performing a second uninterruptible inverse operation to restore the affected reservation location, and
      reporting a failure; and
   if the resulting value is within the range defined by the upper value and the lower value:
      performing a third uninterruptible operation to update an actual value location,
      performing a fourth uninterruptible operation to update an unaffected reservation location, and
      reporting a success.

6. The method of claim 5 wherein the first, second, third, and fourth uninterruptible operations are LOCK XADD operations.

7. A computer readable medium containing computer readable code comprising:
   a code segment for performing a first uninterruptible operation upon the shared value stored in an affected reservation location, the first uninterruptible operation using an operand;
   a code segment for comparing a resulting value of the first uninterruptible operation stored in the affected reservation location to an upper value and a lower value to determine if the resulting value is within a range defined by the upper value and the lower value that can be changed;
   a code segment for performing a second uninterruptible operation to restore the affected reservation location;
   a code segment for reporting a failure if the resulting value is not within the range defined by the upper value and the lower value;
   a code segment for performing a third uninterruptible operation to update an actual value location if the resulting value is within the range defined by the upper value and the lower value;
   a code segment for performing a fourth uninterruptible operation to update an unaffected reservation location if the resulting value is within the range defined by the upper value and the lower value; and
   a code segment for reporting a success if the resulting value is within the range defined by the upper value and the lower value.

8. A processing system for performing addition and subtraction within limits upon a shared value, the processing system comprising:
   a processor configured for
      performing a first uninterruptible operation upon the shared value stored in an affected reservation location, the first uninterruptible operation using an operand;
      comparing a resulting value of the first uninterruptible operation stored in the affected reservation location to an upper value and a lower value to determine if the resulting value is within a range defined by the upper value and the lower value that can be changed;
      performing a second uninterruptible operation to restore the affected reservation location if the resulting value of the first uninterruptible operation is not within the range defined by the upper value and the lower value;
      reporting a failure if the resulting value of the first uninterruptible operation is not within the range defined by the upper value and the lower value;
      performing a third uninterruptible operation to update an actual value location if the resulting value of the first uninterruptible operation is within the range defined by the upper value and the lower value;
      performing a fourth uninterruptible operation to update an unaffected reservation location if the resulting value of the first uninterruptible operation is within the range defined by the upper value and the lower value; and
      reporting a success if the resulting value of the first uninterruptible operation is within the range defined by the upper value and the lower value.

9. A method of performing substraction or addition within limits, the method comprising:
   receiving an operand from a process thread; performing a first uninterruptible operation upon an affected reservation location, the affected reservation location including a first instance of a shared first value, the first uninterruptible operation being configured to generate a second value by subtracting the operand from or adding the operand to the first instance of the shared first value;

comparing the generated second value in the affected reservation location to one or more limit values stored in one or more limit locations;

performing a second uninterruptible operation to restore the shared first value in the affected reservation location if the second value is not within any of the one or more limit values;

reporting a failure if the second value is not within any one of the one or more limit values;

performing a third uninterruptible operation to update a second instance of the shared first value stored in an actual value location if the second value is within the one or more limit values, the actual value location being a memory location shared by a plurality of process threads; and performing a fourth uninterruptible operation to update a third instance of the shared first value stored in an unaffected reservation location if the second value is within the one or more limit values.

10. The method of claim 9, further including reporting a success if the second value is within the one or more limit values.

11. The method of claim 9, wherein the one or more limits values consist of an upper limit value and a lower limit value.

12. The method of claim 9, wherein the first uninterruptible operation is configured to generate the second value by adding the operand to the first instance of the shared first value.

13. The method of claim 9, wherein the first uninterruptible operation is configured to generate the second value by substracting the operation from the first instance of the shared first value.

14. The method of claim 9, wherein the operand has an absolute value greater than one.

15. The method of claim 9, wherein performing the second uninterruptible operation includes using a negative of the operand.

16. The method of claim 9, further including choosing the first affected reservation location on which to perform the first uninterruptible operation, responsive to whether the method is being used to perform a subtraction or addition.

17. The system of claim 1, further including means configured for choosing the first affected reservation location on which to perform the first uninterruptible operation, responsive to whether the system is being used to perform a subtraction or addition.

* * * * *